(12) United States Patent
Breed

(10) Patent No.: US 12,555,463 B2
(45) Date of Patent: Feb. 17, 2026

(54) SECURITY SYSTEM USING TIERED ANALYSIS

(71) Applicant: TYCO Fire & Security GMBH, Neuhausen am Rheinfall (CH)

(72) Inventor: Jason Breed, Concord (CA)

(73) Assignee: TYCO Fire & Security GMBH, Neuhausen am Rheinfall (CH)

( * ) Notice: Subject to any disclaimer, the term of this patent is extended or adjusted under 35 U.S.C. 154(b) by 0 days.

(21) Appl. No.: 18/767,657

(22) Filed: Jul. 9, 2024

(65) Prior Publication Data

US 2024/0362991 A1 Oct. 31, 2024

Related U.S. Application Data

(63) Continuation of application No. 17/690,739, filed on Mar. 9, 2022, now Pat. No. 12,067,860, which is a continuation of application No. 16/634,020, filed as application No. PCT/EP2018/070346 on Jul. 26, 2018, now Pat. No. 11,328,577.

(60) Provisional application No. 62/537,302, filed on Jul. 26, 2017.

(51) Int. Cl.
*G08B 25/00* (2006.01)
*H04L 67/12* (2022.01)

(52) U.S. Cl.
CPC ......... *G08B 25/009* (2013.01); *G08B 25/002* (2013.01); *H04L 67/12* (2013.01)

(58) Field of Classification Search
CPC ...... G08B 25/009; G08B 25/002; H04L 67/12
USPC ..................................................... 340/539.1
See application file for complete search history.

(56) References Cited

U.S. PATENT DOCUMENTS

| 7,089,310 | B1 | 8/2006 | Ellerman et al. |
| 9,800,463 | B2* | 10/2017 | Imes ........................ F24F 11/47 |
| 10,054,329 | B1 | 8/2018 | Hutz et al. |
| 2005/0179553 | A1* | 8/2005 | Fujie ................ G08B 13/19613 340/5.1 |
| 2010/0288468 | A1 | 11/2010 | Patel et al. |
| 2011/0151837 | A1 | 6/2011 | Winbush, III |
| 2011/0169637 | A1* | 7/2011 | Siegler, II ............ G08B 29/188 340/541 |
| 2014/0094137 | A1 | 4/2014 | Gregory |
| 2014/0118143 | A1 | 5/2014 | Monacos et al. |

(Continued)

FOREIGN PATENT DOCUMENTS

| EP | 3118828 A1 | 1/2017 |
| WO | 99/17477 A2 | 4/1999 |

(Continued)

OTHER PUBLICATIONS

International Search Report and Written Opinion issued in International Application No. PCT/EP2018/070346 on Dec. 21, 2018.

*Primary Examiner* — Naomi J Small
(74) *Attorney, Agent, or Firm* — ArentFox Schiff LLP

(57) ABSTRACT

A method for operating a security system, the method including: receiving an indication of an object in a premises; determining, responsive to receiving the indication, to assign an identity to the object based on the indication; tracking movement of the object on the premises; determining, based on the movement, whether to maintain the identity assigned to the object; and in response to determining not to maintain the identity assigned to the object, generating at least one output by the security system.

18 Claims, 11 Drawing Sheets

(56) References Cited

U.S. PATENT DOCUMENTS

| | | |
|---|---|---|
| 2014/0313032 A1 | 10/2014 | Sager et al. |
| 2014/0378159 A1 | 12/2014 | Dolbakian et al. |
| 2015/0082352 A1 | 3/2015 | Cloutier |
| 2015/0160935 A1* | 6/2015 | Nye .................. H04L 67/34 |
| | | 717/178 |
| 2015/0365787 A1* | 12/2015 | Farrell ................ H04W 4/08 |
| | | 455/456.1 |
| 2016/0018798 A1* | 1/2016 | Jiang ................ H04L 12/282 |
| | | 700/275 |
| 2016/0112522 A1 | 4/2016 | Abello et al. |
| 2016/0183037 A1 | 6/2016 | Grohman |
| 2016/0189533 A1* | 6/2016 | Modi ................ G08B 29/185 |
| | | 340/507 |
| 2016/0191865 A1 | 6/2016 | Beiser et al. |
| 2016/0210832 A1 | 7/2016 | Williams |
| 2016/0301373 A1 | 10/2016 | Herman et al. |
| 2016/0335865 A1* | 11/2016 | Sayavong .......... G08B 13/2491 |
| 2017/0013069 A1 | 1/2017 | Grohman |
| 2017/0018167 A1 | 1/2017 | Dey et al. |
| 2023/0391319 A1* | 12/2023 | Penilla ................ H04W 4/027 |
| 2025/0060824 A1* | 2/2025 | Osterhout .......... G06F 3/03542 |

FOREIGN PATENT DOCUMENTS

| | | |
|---|---|---|
| WO | 2005/043930 A2 | 5/2005 |
| WO | 2008/086507 A1 | 7/2008 |

* cited by examiner

SECURITY SYSTEM USING TIERED ANALYSIS

This application is a continuation of U.S. patent application Ser. No. 17/690,739, filed on Mar. 9, 2022, which is a continuation of U.S. patent application Ser. No. 16/634,020, filed on Jan. 24, 2020, which is a 35 U.S.C. § 371 National Phase of PCT Application No. PCT/EP2018/070346, filed on Jul. 26, 2018, which claims priority to U.S. Provisional Application No. 62/537,302, filed on Jul. 26, 2017, the disclosures of each of these applications are hereby incorporated by reference herein in their entireties.

TECHNICAL FIELD

This application relates generally to security systems. More specifically, this application relates to a security system using tiered analysis, such as identifying a person and changing the state of the security system in response to the identification.

BACKGROUND

Security systems typically request users to perform one or more actions to identify themselves. One way of identification is by the user performing an action (such as entering a predetermined code) or wearing a certain device (such as a badge or the like) such that the security system may identify the individual.

BRIEF DESCRIPTION OF THE DRAWINGS

The system may be better understood with reference to the following drawings and description. In the figures, like reference numerals designate corresponding parts throughout the different views.

DETAILED DESCRIPTION

Figure 1:
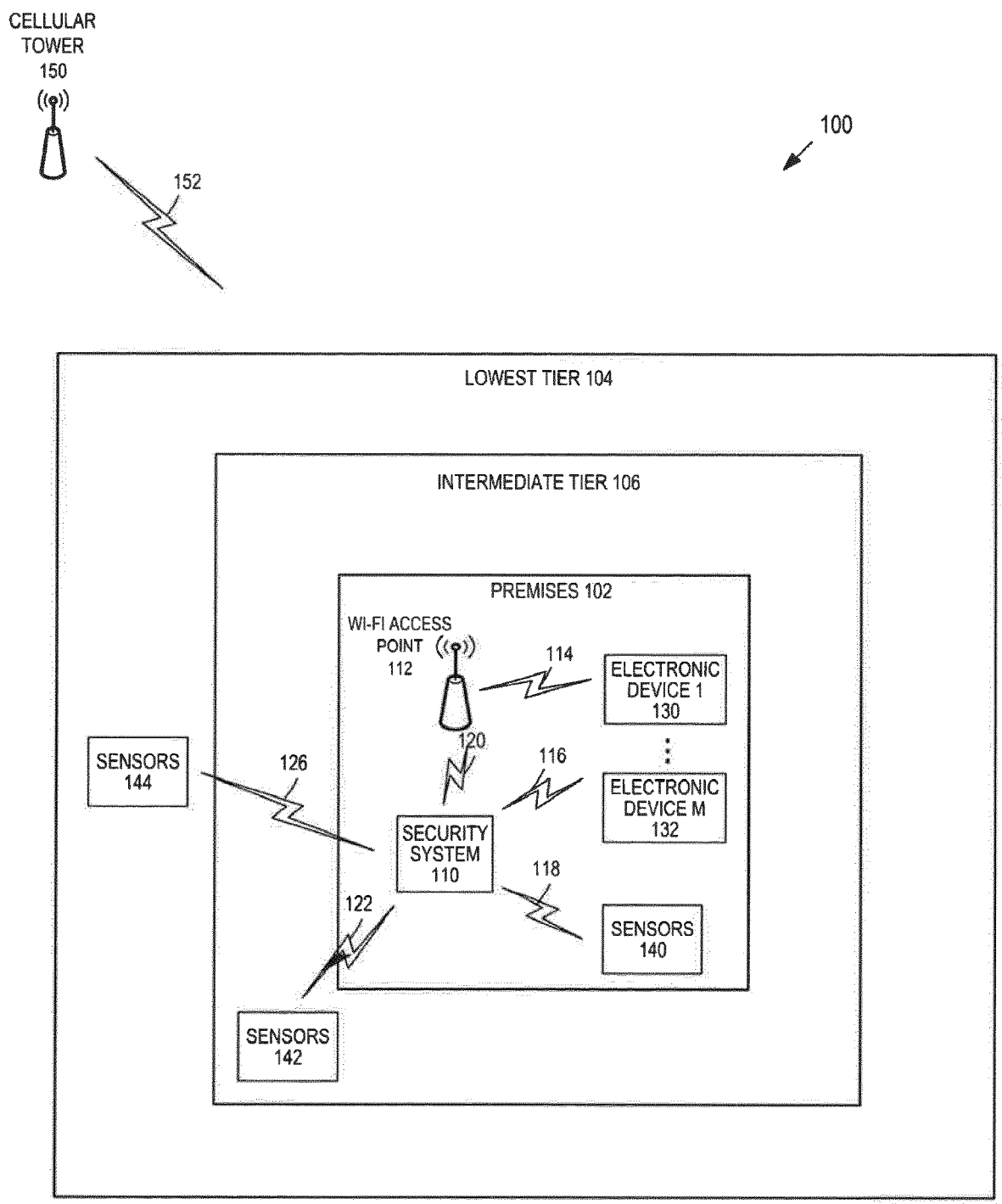
FIG. 1 is an environment of a security system within a premises.

A security system may be configured in multiple tiers for operation. As discussed in more detail below, the tiers may be based on a variety of factors. In one implementation, the tiers may be geographically or positionally based, whereby the security system may be segmented based on position relative to a premises. For example, a home may be defined by different geographic locations, such as 50-100 yards from the home, 0-50 yards from the home, and inside the home. As discussed in more detail below, the operation of the security system may depend on input from sensors positioned in the various tiers.

The multiple tiers of operations may be applied to a variety of uses, such as: identification of an individual; operations of the security system (such as changing the state of the security system); and life safety applications.

For example, the multiple tiers of operations may be used to identify an individual and change the state of the security system accordingly. As discussed in the background, one manner of identification is for the user to perform an action (such as by entering a predetermined code) or to wear a certain device (such as a badge or the like) such that the security system may identify the individual. In this way, the onus is on the individual to alter his or her behavior, either by performing the specified act or by wearing a predetermined device, in order to be identified by the security system.

In one implementation, the security system identifies one or more patterns of the individual, and thereafter uses the pattern(s) to identify a person at the premises as the individual based on comparing one or more inputs associated generated by an as-yet unidentified person and the pattern(s) associated with the individual. For example, sensor(s) may register or sense one or more actions of the as-yet unidentified person (or electronics associated with the as-yet unidentified person), with the sensor output being compared with sensor output of a known or previously-identified person. In response to the comparison determining that the sensor output from the as-yet unidentified person matches, to a predetermined degree of certainty, with the sensor output of the known or previously-identified person, the system may identify the as-yet unidentified person as the known or previously-identified person.

As discussed in more detail below, patterns may manifest themselves in different ways. In one implementation, the security system may identify patterns based on sensor information (e.g., motion sensors, heartbeat sensors, identification of electronic devices, or the like). For example, the security system may receive input from a heartbeat sensor. The heartbeat sensor is one example of a passive biometric sensor. Other types of passive (e.g., where the person does not actively provide input) biometric sensors are contemplated. Responsive to the input from the heartbeat sensor, the security system may compare the input with sensor inputs of known individuals (such as known occupants of the premises). In particular, the heartbeat pattern for one or more known individuals may be recorded, and may be accessed in order to be compared with the heartbeat as sensed by the heartbeat sensor. Based on the comparison (e.g., that the input from the heartbeat sensor is correlated to the known input from an occupant of the premises), the security system may identify the individual. Conversely, the security system may determine that the person detected on the premises is not a known occupant in response to determining that the input from the heartbeat sensor does not correlate to any known input of occupant of the premises. In another implementation, the security system may identify patterns based on information other than sensor information (e.g., external databases, such as weather databases). In still another implementation, the security system may identify patterns based on sensor input (e.g., motion sensor information) and non-sensor input (e.g., external database calendar information).

In a first way, the individual may have one or more patterns for use of electronic devices, such as cellular phones, home phones, computers, communication (e.g., Wi-Fi connection), televisions, radios, table computers (e.g., iPad), or the like. The use of the electronic devices may be automatic (such as an electronic device automatically communicating and/or connecting to a premises communication system) or may be manual (such as the individual activating an aspect of the electronic device).

As one example of an automatic use, the individual may carry with himself or herself a cellular phone, which may have one or more electronic signatures that may be used to identify the individual. In one specific example, the cellular phone may automatically connect to the premises communication system (e.g., the home Wi-Fi network) when within communication range of the premises. In this regard, the security system may access the automatic connection as part of the identification of the individual, as discussed in more detail below. In another specific example, the cellular phone may communicate with other devices (such as a cellular tower), with the security system accessing the communications in order to identify the individual.

As another example of an automatic use, the individual may carry the cellular phone through the premises, such as in various rooms of the home. Separate from identifying the electronic signature of the cellular phone, the movement of the electronics (such as the cellular phone) through the premises may be tracked in order to compare the movement to an identified pattern of the individual. For example, a specific individual may have a pattern of entering through the garage of the home (or more specifically, from a specific door in a multi-garage home), may momentarily stay in the entryway (such as a mudroom), and then may proceed through the kitchen into the family room. The security system may track the movement of the signal of the cellular phone through the home (e.g., in the garage, into the mudroom, through the kitchen and into the family room) and/or may track the amount of time the security system senses that the cellular phone is in each of the sections of the home (e.g., the amount of time the security system senses that the cellular phone is in the garage, the amount of time the security system senses that the cellular phone is in the mudroom, the amount of time the security system senses that the cellular phone is in the kitchen, etc.) in order to compare the tracked data to an identified pattern of the individual.

As one example of a manual use, the individual may perform one or more manual actions associated with the electronic devices. Specifically, the individual may turn on an electronic device (e.g., turning on the television) or may charge an electronic device (e.g., plug a cellular phone into a charger). Alternatively, the security system may monitor power usage (such as electric power usage) in the premises to identify a specific individual and/or identify that an individual is on the premises.

As another example of manual use, the individual may use the electronic devices in an identifiable pattern. In one specific example, the individual may activate an electronic device to connect to the Internet. In particular, the individual may use his or her cellular phone or a tablet computer to connect to the Internet. The security system may monitor this connection via the premises network (e.g., the home Wi-Fi system) for the connection itself, and/or for the timing of the connection since the initial cellular phone signal was detected (e.g., the security system may track the time in which the cellular phone initially connects to the home Wi-Fi system and the time in which the cellular phone accesses the Internet via the home Wi-Fi system). In another specific example, the individual may use his or her cellular phone or a tablet computer to connect to a specific Internet address on the Internet. In particular, the individual may have a pattern of connecting to certain Internet sites tailored to the individual, such as a specific Facebook account (that is assigned to the individual), a specific Instagram account, a specific Snapchat account, etc. Alternatively, the individual may have a pattern of connecting to a specific Internet site, such as CNN.com. In either instance, the security system may track the Internet usage and compare with previous patterns associated with the individual.

In a second way, the individual may have one or more patterns for devices other than electronic devices. One type of device is an automobile. The individual may have a certain pattern associated with use of the automobile. In one example, the individual may park the automobile in a certain spot in the premises (e.g., in a multi-car garage home, the individual may park in a certain spot). In the example of an electric automobile, the individual may plug the vehicle into a specific charger at the premises. As still another example, the individual may activate a specific garage door when entering the premises. More specifically, in the instance where there are multiple garage doors in the premises, and where the individual has an identifiable pattern of activating a particular garage door to enter the premises, the security system may track such activity. As yet another example (particularly with multiple garages in the premises), there may be different entrance doors associated with each garage in the premises. The individual may have an identifiable pattern of entering a specific entrance door. In this regard, the security system may monitor various aspects associated with the automobile, such as the garage door opening, the parking in a particular parking spot in the premises (e.g., a sensor indicating that a car is parked in the particular parking spot), the specific entrance door into the premises, and/or the activation of electric charging, in order to identify whether the person in the premises is an identifiable individual.

Other types of devices include, but are not limited to: household appliances (e.g., oven, dishwasher, microwave, washing machine, dryer); electric lights (e.g., pattern of turning on certain lights in the home); HVAC (e.g., pattern of setting of temperature in the home).

In a third way, the individual may have one or more behavioral patterns. One type of behavior pattern is presence in the premises (e.g., where the individual typically stays in the home or how the individual travels amongst the different parts or rooms of the home). As discussed above, one way to track the individual is by monitoring an electronic device associated with the individual (such as a cellular phone associated with the individual). Another way to track the individual is by using electronics, such as heat sensors, to track the individual presence in various parts of the premises. Still another type of way to monitor the individual is to determine whether the person at the premises conforms to the schedule of an identified individual. For example, the security system may be aware of the schedule of the identified individual (e.g., by accessing an electronic calendar of the identified individual or by receiving manual input by the identified individual of his/her schedule). The security system may thus potentially identify the person based on the schedule of the identified individual.

Another type of behavior is noise level, either generated by the individual or generated by electronic devices typically controlled by the individual. The security system may monitor the noise level in order to determine whether the monitored noise level corresponds to the noise pattern associated with the individual. Behavior may likewise be monitored using biometrics. In one instance, biometrics may be used to identify the individual. In another instance, biometrics may be used to identify a pattern associated with the individual, and then the compare the identified patterns to a recorded pattern.

The security system may identify the pattern(s) discussed above in one or more ways. In a first way, the security system may actively request individual input in identifying the pattern(s). For example, the security system may provide a list of options to the individual that may be tracked, such as cellular phone usage, connection to home Wi-Fi network, with the individual providing input as to the options selected for tracking. In a second way, the security system may passively monitor the pattern(s) of the individual. In a first specific implementation, the security system may track a plurality of patterns (e.g., cellular phone usage, electronic device usage, etc.) and may rank the plurality of patterns for consistency. In particular, the security system may determine that the individual typically uses the cellular phone in an identifiable pattern but does not enter the premises in a regular pattern. In that regard, the security system may select, based on consistency, which patterns to use to identify the individual.

In still another way, the security system may monitor one or more external databases. As one example, the security system may access one or more external cloud databases. One type of cloud database may comprise a calendar database (e.g., a Google calendar database). The security system may access the calendar associated with one or more occupants of the premises to determine whether the occupant(s) are scheduled to be in the premises or scheduled to be outside of the premises. In particular, if the occupants are scheduled to be outside of the premises (e.g., at work or at a doctor's appointment), the security system may change its current state to a heightened state (e.g., to an alarm state, or to a state that more closely monitors the premises in anticipation of an alarm). Another type of cloud database comprises a weather information database. The security system may access weather information in order to determine whether the weather is indicative of the occupant more likely being in the premises. For example, in response to the security system being notified of inclement weather, the security system may determine that it is more likely that the occupant(s) of the premises are resident in the premises. In turn, the security system may use this determination of the likelihood of the occupant on the premises in determining whether to change the state of the security system. For example, responsive to the security system determining that it is likely the occupant is on the premises, the security system may be less likely to change the state of the security system.

Separate from using the data to change the state or determine an alarm event, the security system may use the data in the external database(s) in order to determine whether and/or whom to notify of an alarm event. In the calendar example above, the security system may determine, based on the external calendar database, the occupant that is scheduled to be away from the premises. Responsive to this determination, the security system may change the state of the system and/or may determine to send a notification, as discussed above. With regard to the notification, the security system may determine which party to notify based on the data from the external database(s). For example, the security system may determine to notify the occupant that is scheduled to be away from the premises (e.g., send a text message to the cellular phone of the occupant that is scheduled to be away from the premises with a message of movement inside the premises). In one implementation, the security system may iteratively access the external databases. For example, the security system may request data from the external databases as a person proceeds closer to and into the premises (e.g., as the person moves through the different geographic tiers of the premises). Further, the security system may be prompted or triggered to access the external database(s) responsive to input from the system (e.g., responsive to motion sensor input that a person is on the premises). In this regard, the sensor output may be used to trigger accessing the external database(s).

In another implementation, the security system may use a tiered analysis to control operation of the security system. In one operation of the security system, a tiered analysis may be used to identify a person on the premises. In another operation of the security system, a tiered analysis may be used to determine whether (and potentially how) to activate an alarm.

In one example, the tiered analysis may be based on positioning, such as distance from the premises. In one specific example, three-tier stages may be used based on proximity from the premises, such as a lowest tier, an intermediate tier, and a final tier. Though the discussion below focuses on three-tier stages, other numbers of tiers are contemplated. In one implementation, the lowest/intermediate/final tiers may be defined statically, such as the lowest tier being a first predefined region (e.g., 100-200 feet from the front door of the premises), the intermediate tier being a second predefined region (e.g., 0-100 feet from the front door of the premises), and the final tier a third predefined region (e.g., within the premises). Other distances for the tiers are contemplated.

In a second implementation, the lowest/intermediate/final tiers may be defined based on the sensory input (in a static or dynamic manner). In a first specific example, the tiers may be based on the input provided to the security system. As one example, input provided by a cellular phone may trigger a first set of tiers (and a first set of associated rules) whereas input provided by motion detectors may trigger a second set of tiers (and a second set of associated rules). In a second specific example, the tiers may be based on dynamic analysis of the security system. As one example, sensor input from one or multiple sensors may define the tiers in a dynamic way. In one specific way, in response to the system receiving input from sensor(s), the system may define the distances of the tiers. In one implementation, a single sensor being triggered, such as the motion detector, may generate a first set of tiers. In a second implementation, multiple sensors, such as the motion detector and the sound sensor, may generate a second set of tiers, with the first set of tiers being different from the second set of tiers.

Thus, a tiered security system may address brake-ins, which typically begin from a perimeter of the premises, with the intruder approaching the premises prior to committing the crime. Multi-tiered warning, as performed by the security system, may focus on one or more aspects based on the respective tier. In this regard, the multi-tiered security system may focus on preventative measure(s) prior to the actual break-in, either by warning sounds or dispatching the authority to avoid break in. As discussed in more detail below, various actions, such as determining whether an alarm event is occurring and/or determining what output to generate, may depend on the tier in which the sensor input was generated.

In the lowest stage with use of perimeter detection, the security system may use one or more sensors to sense a person at the perimeter. The one or more sensors may comprise motion sensors or the like. In response to sensing a person, the security system may perform one or more actions. For example, in response to sensing a person, the security system may attempt to identify the person. In a specific implementation, when a microwave detector senses movement around the home, the system may trigger video image capture and send the image captured to the cloud for analysis and notify the owner of the building with visual information.

If the security system identifies the person, the security system may do one or both of the following: (1) change configuration of system (enable lights or turn up/down temperature in the home); or (2) train the algorithm used by the security system to identify the user for future analysis (e.g., repeated capture of the home owner approaching the home (image, movement signature, etc.) can be used to recognize the owner by software algorithm). If the security system fails to identify the person, the security system may do one or both of the following: (1) change state of system (e.g., heightened alert); (2) send a communication to the mobile electronic device associated with a predetermined person (such as the home owner) or to an electronic device in the interior of the house requesting input. The communication may include a picture of the person detected, and requesting whether this person is authorized.

The security system may receive input from one or more sensors positioned in the intermediate stage, such as a security enabled door lock, a shock/vibration sensor, or the like. For example, the security system may receive input from the security enabled door lock. Responsive to the input, the security system may determine that the entry is authorized or unauthorized. In response to the security system determining that the entry is authorized (e.g., door unlocking by key or motorized door lock), the security system may, based on the determination in the lowest stage, decide the response. As one example, in response to the security system in the lowest stage identifying the person and in response to the determination of an authorized entry, the security system may determine that no output (either in the form of a request for input or in the form of an alarm) is necessary. As another example, in response to the security system in the lowest stage failing to identify the person and in response to the determination of an authorized entry, the security system may determine that an output is warranted. The output may comprise a request for vocal input from the person for identification purposes. The security system may then analyze the vocal input provided by the person in a further attempt to identify the person.

In response to the security system determining that the entry is unauthorized (e.g., tampering of locks or windows), the security system may, based on the determination in the lowest stage, decide the response. As one example, in response to the security system in the lowest stage failing to identify the person and in response to the determination of an unauthorized entry, the security system may immediately generate an alarm output. The alarm output may take the form of an aural alarm on the premises (e.g., a horn output) and/or may take the form of an electronic communication to another electronic device (e.g., an electronic communication to a central monitoring system and/or to an electronic device associated with the owner of the premises). As another example, in response to the security system in the lowest stage identifying the person and in response to the determination of an unauthorized entry, the security system may determine that an output is warranted (e.g., request vocal input from the person for identification purposes).

In the final tier, the security system may determine the response based on one or more events in the lowest and/or intermediate tiers, such as the response based on input from one or more sensors positioned in the premises. For example, in case of an illegitimate or indeterminate event in the lowest and/or intermediate tiers (such as a failure to identify a person), activation of a sensor (such as output from a motion detector in the premises or a glass break sensor) may trigger an immediate alarm by the security system. As another example, operation of sensors positioned in the final tier may likewise be modified based on activity in the lowest or intermediate tiers (e.g., setting higher gain or a lower debounce time to allow better detection since pre-alarm trigger validated the entry of a burglar).

Apart from outputting an alarm, the security system may send a communication in response to one or more activities in the various tiers. The communication may be output at the premises. In particular, the communication may be indicative of an alarm and/or may request input (e.g., input to identify the person). The communication likewise may be targeted to the specific tier (e.g., to the lowest, intermediate, or final tier) or may be targeted within the specific tier (communication is output to the specific location within the house where the person is detected, e.g., the kitchen). Alternatively, or in addition, the communication may be sent to an electronic device, which may be remote from the house. In this instance, the communication may solicit input. The electronic device may be a device associated with the individual presumed by the security system to be the person on the premises and/or may be a device associated with the security system.

In a third implementation, the security system may receive one or more inputs, change its state, and generate an output requesting input from a person (either resident at the premises or remote from the premises). In a first specific implementation, the output may request a person resident at the premises to provide identification data (such as a voice command). In a second specific implementation, the output may provide information to a person remote from the premises and to request input as to how the security system should proceed.

In this regard, the security system may actively review information from multiple sources to determine if authorized users are generating events. The security system may therefore be able to determine if these events are likely to be false alarms, or initiate validation steps to confirm if a false alarm is occurring before initiating a full alarm. The security system may use the various methodologies, such as those listed above, to validate a person at the premises. As one example, if the security system detects the front door of the premises is open, and the security system determines that this event is within the normal schedule for a validated user to enter the premises, the security system may initiate a voice identification procedure to prompt the person to state who he or she is, and validate the voice input against known voice patterns. As another example, if the inputs indicate suspicious activity, can again initiate voice identification.

As another example, the multiple tiers may be used for operation of the security system. Separate from (or in addition to) identification of the individual, the security system may modify its operation (e.g., change a state of the security system) based on input from devices positioned in and/or assigned to the various tiers. For example, the security system may operate in one of several states. The respective state of the security system may define its current operation, as well as the output of the security system (e.g., whether an alarm is output at the premises or to a central station; the configuration of sensors at the site; etc.). In one implementation, the state of the security system may depend on inputs from devices positioned in or assigned to the various tiers in the security system. In particular, responsive to input from sensors positioned in the perimeter of the premises (such as input from motion, light, or sound sensors positioned 50-100 yards from the premises), the security system may change its current state from a first state to a second state different from the first state (e.g., from a "normal" state to a "heightened" state, with the "heightened" state more likely to output an alarm than the "normal" state).

In particular, the security system in the second state (e.g., the "heightened" state) may operate in proactive and/or reactive manner. With regard to proactive actions, the security system may modify operation of sensors in a same and/or a different tier based on the "heightened" state. For example, the security system may activate other sensors positioned in or associated in a different tier (e.g., a tier that is more interior to the dwelling). In particular, in response to receiving input from a sensor in the 50-100 yard tier, the security system may modify operation of at least one aspect of sensors in the 0-50 yard tier (e.g., increase the sensitivity of the sensors, increase the frequency of transmitting sensor data to the security system, turning on the sensor (e.g., turning on lights at one or more entrances to the premises), turning on the sensor and begin transmitting data (such as turning on a camera and transmitting still pictures or video), etc.

With regard to reactive actions, the security system may modify determination whether an alarm event has occurred based on the changed state of the system (e.g., the change to the "heightened" state). In particular, the security system may access patterns, which may be pre-stored or dynamically learned. In one implementation, the patterns may correlate sensor input to a new state of the security system. For example, the sensor input may define a change from the "normal" state to the "heightened" state, as discussed above. The change in state may result in one or more changes in operation of the security system. In one implementation, the change in state results in a new set of parameters for the changed state. For example, the changed state (from the "normal" state to the "heightened" state) results in the security system now operating in the heightened state. In another implementation, the change in state triggers an analysis by the security system. For example, the change in state may trigger the security system to identify the person on the premises. In response to the security system determining that the person has not been determined within a predetermined amount of time (such as by setting a timer since the change in state), the security system may generate an output (such as an alarm or a request for input from the person in order to identify the person).

Alternatively, or in addition, the patterns may correlate a determination of an alarm event within a current state. For example, the security system may be in the "heightened" state, and may receive sensor input. The patterns may dictate whether, based on the sensor input received and the "heightened" state, whether an alarm event has occurred. In one implementation, the patterns are correlated to different uses of the premises, such as uses considered "normal" (not resulting in an alarm event) and uses considered "abnormal" (resulting in an alarm event). Depending on the current state of the system, uses considered "normal" in a first state may be considered "abnormal" in the second state. As one example, a motion sensor in the outer tier (e.g., 50-100 yards) and positioned in a path to a back entrance may send a communication to the security system indicative that a person is in the path to the back entrance. This communication may result in a change to the "heightened" state. Another motion sensor in an inner tier (e.g., 0-50 yards) may thereafter send a communication to the security system indicative that a person is in the inner tier of the premises. The security system may determine whether an alarm event has occurred depending on the state of the security system (e.g., whether in the "normal" state or the "heightened" state). For example, in response to receiving the indication that a person is in the inner tier of the premises and the current state of the security system is in the "normal" state, the security system may determine that an alarm event has not occurred (resulting in no output being generated). In contrast, in response to receiving the indication that a person is in the inner tier of the premises and the current state of the security system is in the "heightened" state, the security system may determine that an alarm event has occurred (resulting in an output being generated). As another example, the security system may include noise sensors at each of the outer (e.g., 50-100 yards) and inner (e.g., 0-50 yards) tiers. Responsive to receiving input from the noise sensor first at the outer tier (resulting in a change to the "heightened" state) and to receiving input from the noise sensor thereafter at the inner tier, the security system may determine that an alarm event has occurred. Conversely, responsive to receiving input from the noise sensor at the inner tier (without previously receiving input from the noise sensor at the outer tier), the security system may determine that an alarm event has not occurred.

As one example, the security system may change thresholds for determining whether an alarm event has occurred (e.g., reduce the threshold that is used to compare against the sensor output, with an alarm event being determined when the sensor output exceeds the threshold).

As another example, the security system may change which people and/or which devices are notified when the security system determine that an alarm event has occurred. In particular, the security system may notify a user in the premises based on being the heightened state. As discussed in more detail below, the security system may determine which people are currently in the premises (e.g., by identifying patterns). In response to determining the occurrence of an alarm event, the security system may identify electronic devices that are associated with the people identified as being currently in the premises, and accordingly send a notification to the identified electronic devices. In this regard, the security system may use the additional input in order to analyze in the heightened state.

Referring to the figures, FIG. 1 is an environment 100 of a security system 110 within a premises 102. As shown, environment 100 includes multiple tiers, such as the lowest tier 104, the intermediate tier 106 and the final tier (which in one example is coextensive with the premises 102). As discussed above, different numbers of tiers are contemplated. Further, the tiers 104, 106 may be defined in one of several ways. In one way, the tiers 104, 106 may be defined based on geographic areas. As shown, the tiers 104, 106 are square shaped; however, other shapes are contemplated. Alternatively, the tiers 104, 106 may be defined based on various sensors in the system.

As shown in FIG. 1, sensors are positioned in the different tiers, such as sensors 144 in lowest tier 104, sensors 142 are in intermediate tier 106, and sensors 140 are in premises 102. For example, sensors 144 may comprise motion sensors or the like, which may be positioned in the surroundings (such as the garden) of premises 102. As another example, sensors 142 may comprise door locks (such as security-enabled door locks at the door into premises 102), glass break sensors, shock/vibration sensors, or the like that generate information on activity within or at the periphery of intermediate tier 106. As still another example, sensors 140 may comprise motion detector sensors, noise sensors or the like that generate information regarding activity within premises 102.

The security system 110 may communicate with various electronic components, such as sensors 140, 142 and 144 in the various tiers. The communication may be wired, wireless, or a combination of both. As shown in FIG. 1, the communication is wireless; however, any discussion herein with regard to wireless communication may equally apply to wired communication, or a combination of wired and wireless communication. As shown, the security system 110 communicates wirelessly 118, 122, 126 with sensors 140, 142, 144. The security system 110 may communicate with the sensors 140, 142, 144 via the same wireless protocol or via different wireless protocols.

Premises 102 may further include a local area network, such as a Wi-Fi network that includes a Wi-Fi access point 112. One or more electronic devices, such as electronic device 1 (130) may communicate wirelessly via a Wi-Fi communication signal 114 with Wi-Fi access point 112. Wi-Fi access point 112 may include a sign-in process whereby electronic devices, such as electronic device 1 (130), exchanges sign-in information in order to communicate via Wi-Fi access point 112. Part or all of the sign-in information may be transmitted (illustrated via 120) to security system 110. As discussed in more detail below, security system 110 may use the sign-in information to determine identifying information associated with electronic devices that are communicating with Wi-Fi access point 112 and in turn to determine the identity of a person in environment 100.

Environment 100 may further include one or more external communication systems, one example of which is illustrated by cellular tower 150. Similar to communication with Wi-Fi access point 112, security system 110 may communicate with cellular tower 150 in order to obtain identifying information associated with electronic devices that are communicating with cellular tower 150 and in turn to determine the identity of a person in environment 100.

Figure 2:
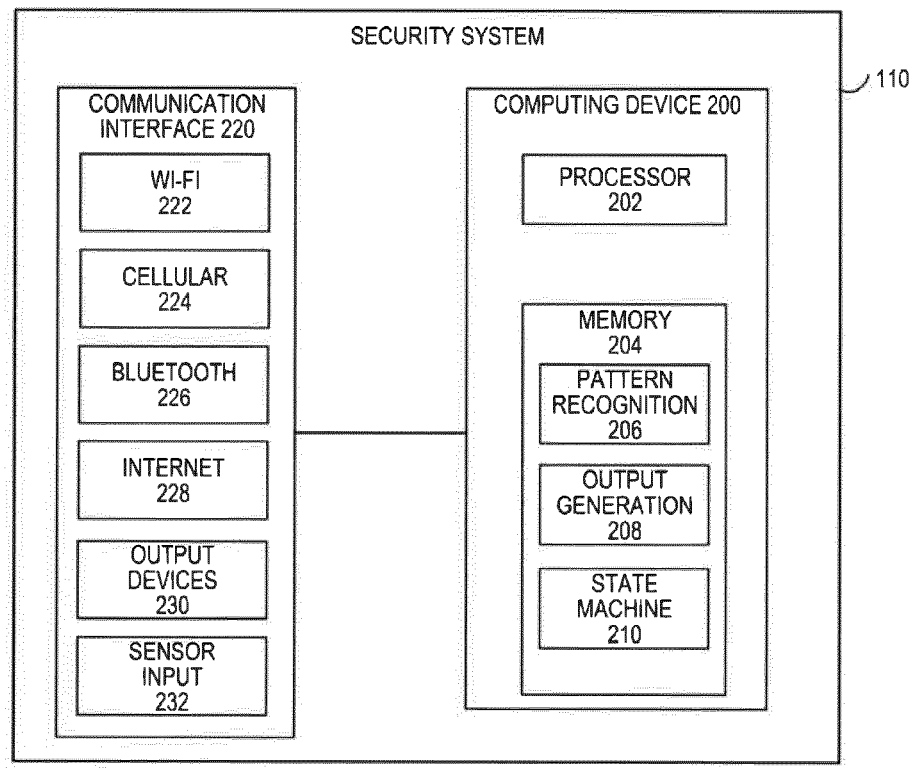
FIG. 2 is a block diagram of the security system.

FIG. 2 is a block diagram of the security system 110. Security system 110 includes computing device 200. Computing device 200 may comprise a single computing entity (such as a single computer), or multiple computing entities. Further, the blocks within security system 110 are segmented by functionality for illustration purposes. In this regard, the single computing entity may perform all of the functionality listed. Alternatively, the functionality may be performed across the multiple computing entities.

Computing device 200 includes processor 202, which can take the form of processing circuitry, a microprocessor or controller, logic gates, switches, an application specific integrated circuit (ASIC), a programmable logic controller, and an embedded microcontroller, for example. Computing device 200 further includes memory 204, which may comprises a computer-readable medium that stores computer-readable program code (e.g., software or firmware) executable by the (micro)processor. In one implementation, processor 202, running functionality in memory 204, performs the various functions described herein and shown in the flow diagrams. In an alternate implementation, processor 202, such as in the form of logic gates, performs the various functions described below and shown in the flow diagrams without the assistance of memory 204.

Figure 3:
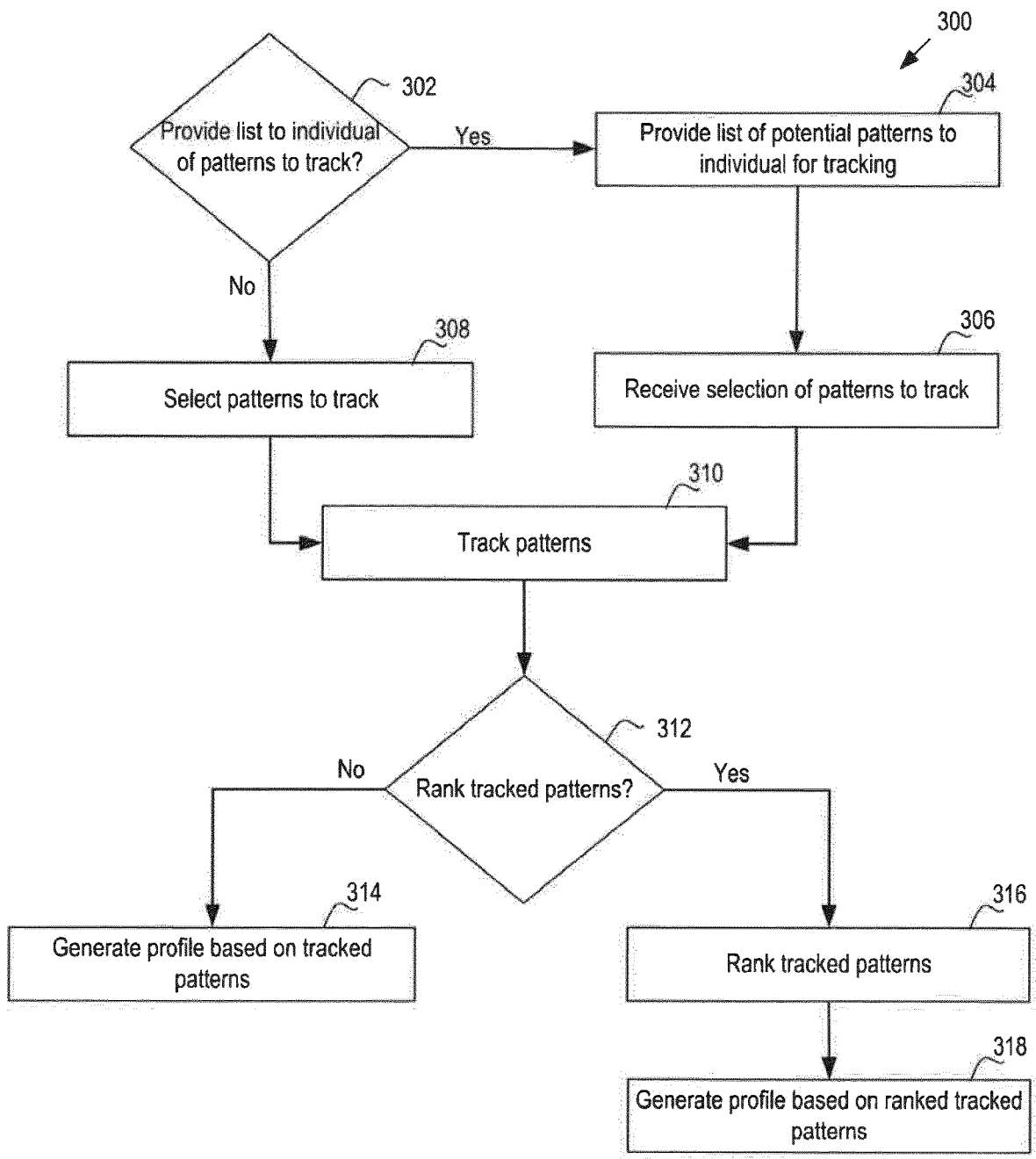
FIG. 3 is a flow chart of one example of tracking patterns of individuals and generating profiles based on the tracked patterns.

Memory 204 includes pattern recognition 206, output generation 208, and state machine 210. Pattern recognition 206 comprises functionality which enables the security system to identify patterns associated with individuals, such as illustrated in FIG. 3, and thereafter to identify individuals based on the patterns, such as illustrated in FIGS. 4-9. Output generation 208 comprises functionality for determining whether and/or how to generate outputs based on pattern recognition 206 and state machine 210. For example, output generation 208 may determine to generate an output to the person on the premises requesting identification information. As another example, output generation 208 may determine to generate an output to send to a central facility (remote from environment 100) notifying of an intruder to the premises. State machine 210 comprises functionality for determining the state of the security system 110. As discussed in more detail below, the state of the security system may change based on one or more inputs to the environment 100, such as inputs to the various tiers in the environment 100.

FIG. 3 is a flow chart 300 of one example of tracking patterns of individuals and generating profiles based on the tracked patterns. As discussed above, individuals may exhibit one or more patterns. After identifying the patterns, the security system 110 may use the pattern(s) in order to identify persons on the premises. As discussed above, the security system 110 may solicit input from the individual in order to track patterns. For example, at 302, it is determined whether to provide a list to the individual of potential patterns to track. As discussed above, various types of patterns may be tracked include patterns associated with communication, physical behavior, or the like. If it is determined to provide the list of patterns to track, at 304, the security system 110 provides the list of potential patterns to track. At 306, the security system 110 receives selection of the patterns to track. Alternatively, at 308, the security system 110 selects the patterns to track without soliciting input from the individual.

At 310, the security system 110 tracks the patterns. In one implementation, the security system 110 tracks the patterns during a predetermined period, such as in a learning phase of the security system 110. In another implementation, the security system 110 tracks the patterns during various periods, such as in a learning phase of the security system 110 and/or in an operation phase of the security system 110.

At 312, the security system 110 determines whether to rank the tracked patterns. Certain characteristics of the individual may be more pronounced or defined. In this regard, these characteristics may exhibit a more defined pattern of behavior, and may be emphasized when creating a profile of the individual, which may be subsequently used to identify the individual as discussed in more detail below. For example, a specific individual may have a repeatable and identifiable pattern of entering the premises and performing certain actions (such as turning on certain lights, connecting to Wi-Fi, visiting certain web sites). Thus, if ranking is performed, at 316, the tracked patterns are ranked, such as based on the strength of the pattern correlated to identifying the individual. At 318, the security system 110 generates a profile of the individual based on the ranked tracked patterns. Alternatively, if the patterns are not ranked, at 314, the security system 110 generates the profile based on the tracked patterns.

Figure 4:
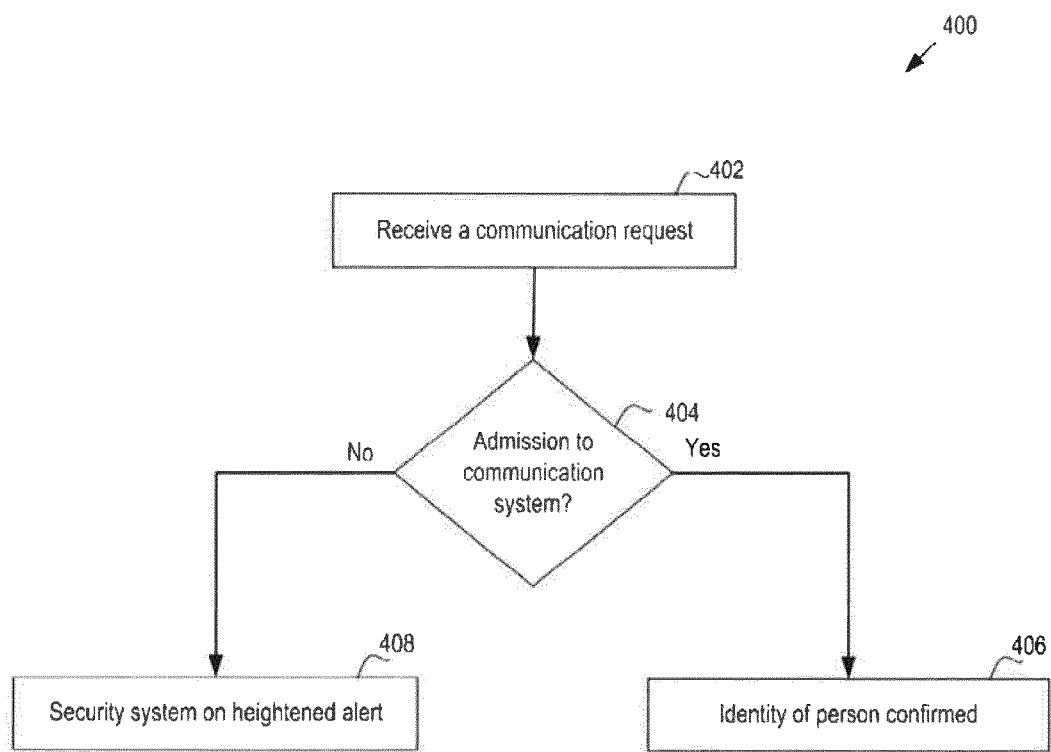
FIG. 4 is a flow chart of one example of monitoring communication requests in order to determine the identity of a person on the premises.

FIG. 4 is a flow chart 400 of one example of monitoring communication requests in order to determine the identity of a person on the premises. As discussed above, various patterns, such as communication patterns, may be used to identify a person on the premises. At 402, the environment 100 receives a communication request. An electronic device may generate the communication request to one or more systems, such as a local area network (such as a Wi-Fi network resident in environment 100), a cellular network (such as using cellular tower 150), or the like. The security system 110 may be notified of the communication request either directly (e.g., the Wi-Fi network is part of the security system) or indirectly (e.g., the Wi-Fi network is in communication with the security system 110). At 404, it is determined whether the electronic device that generated the communication request is admitted to communicate via the communication system. In the example of a Wi-Fi network, the admission may take the form of logging into the Wi-Fi network, with the Wi-Fi network receiving identification information in order to allow the electronic device to communicate via the Wi-Fi network. If the electronic device is admitted to communicate via the communication system, at 406, the identity of the person is confirmed. In the example of the Wi-Fi network, the identification information, used to allow the electronic device to communicate via the Wi-Fi network, may be used by the security system to identify the person. In particular, the profiles compiled by the security system, such as discussed above with regard to FIG. 3, may include communication identification information. The security system may match the identification information used to allow the electronic device to communicate via the Wi-Fi network with the communication identification information in one of the profiles, and thereby assign the matched profile to the identity of the person.

Alternatively, in response to denying admission to the communication system, at 408, the security system may be placed on heightened alert. One example of heightened alert comprises changes the state of the system, as discussed in more detail below.

Figure 5:
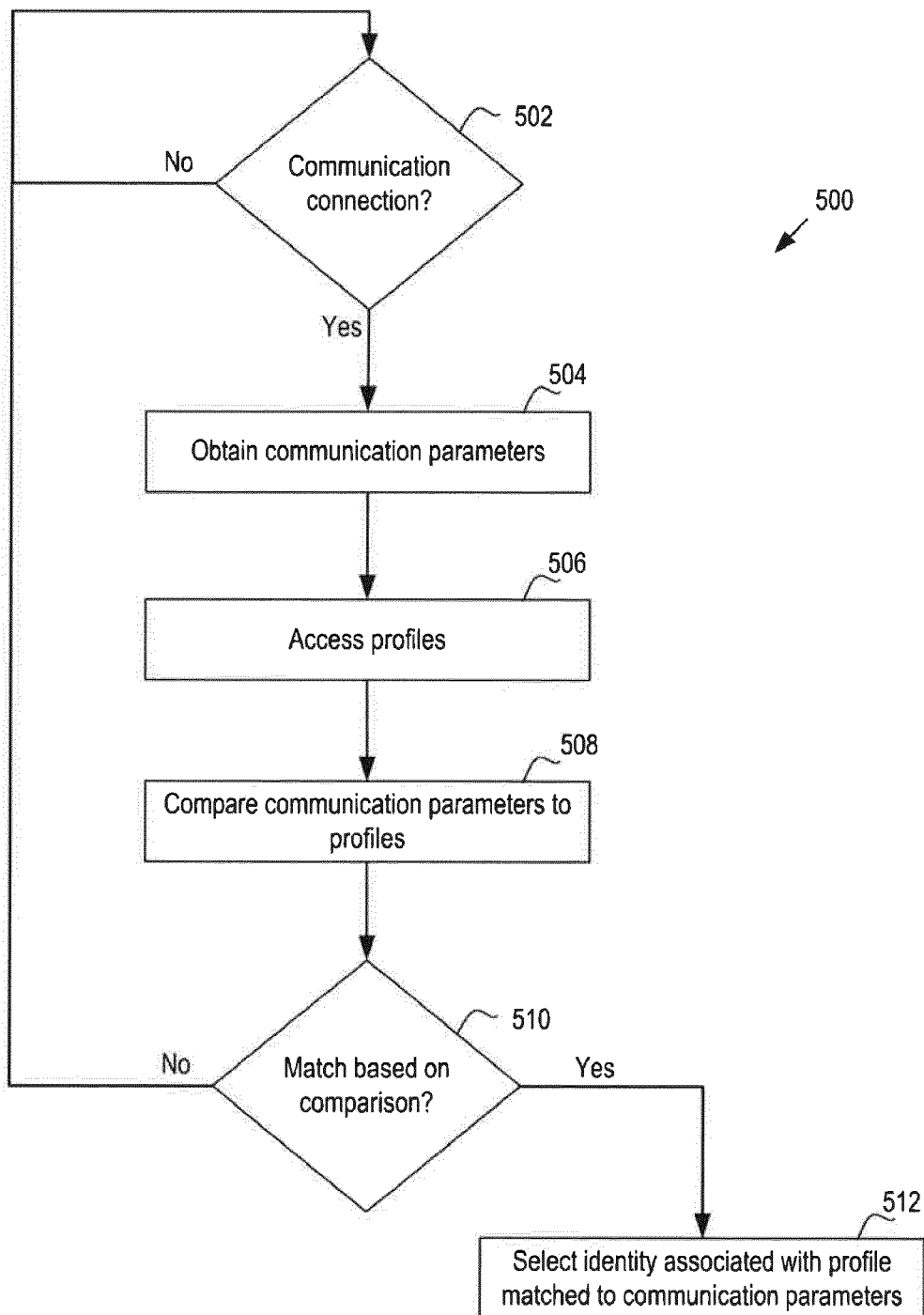
FIG. 5 is a flow chart of another example of monitoring communication requests in order to determine the identity of a person on the premises.

FIG. 5 is a flow chart 500 of another example of monitoring communication requests in order to determine the identity of a person on the premises. At 502, it is determined whether there is an attempt to communicate in the environment 100. If so, at 504, one or more communication parameters are obtained. Example communication parameters may include, but are not limited to, unique identifying information associated with the electronic device, such as SIM card identification associated with a mobile cellular device.

At 506, one or more profiles may be accessed. As discussed above, the security system 110 may generate profiles that identify patterns or unique characteristics of individuals. The profiles may include communication parameters associated with individuals, such as SIM card identification associated with mobile cellular devices used by respective individuals. At 508, the security system 110 may compare the communication parameters with the profile(s) (such as the communication parameters stored in the profiles). At 510, the security system may determine whether there is a match (e.g., if the communication parameters obtained match the communication parameters stored in a respective profile). If so, at 512, the security system 110 may select the identity associated with the profile that matched the communication parameters (e.g., the specific person assigned to the respective profile that matched). If not, the flow chart 500 loops back to 502.

Figure 6:
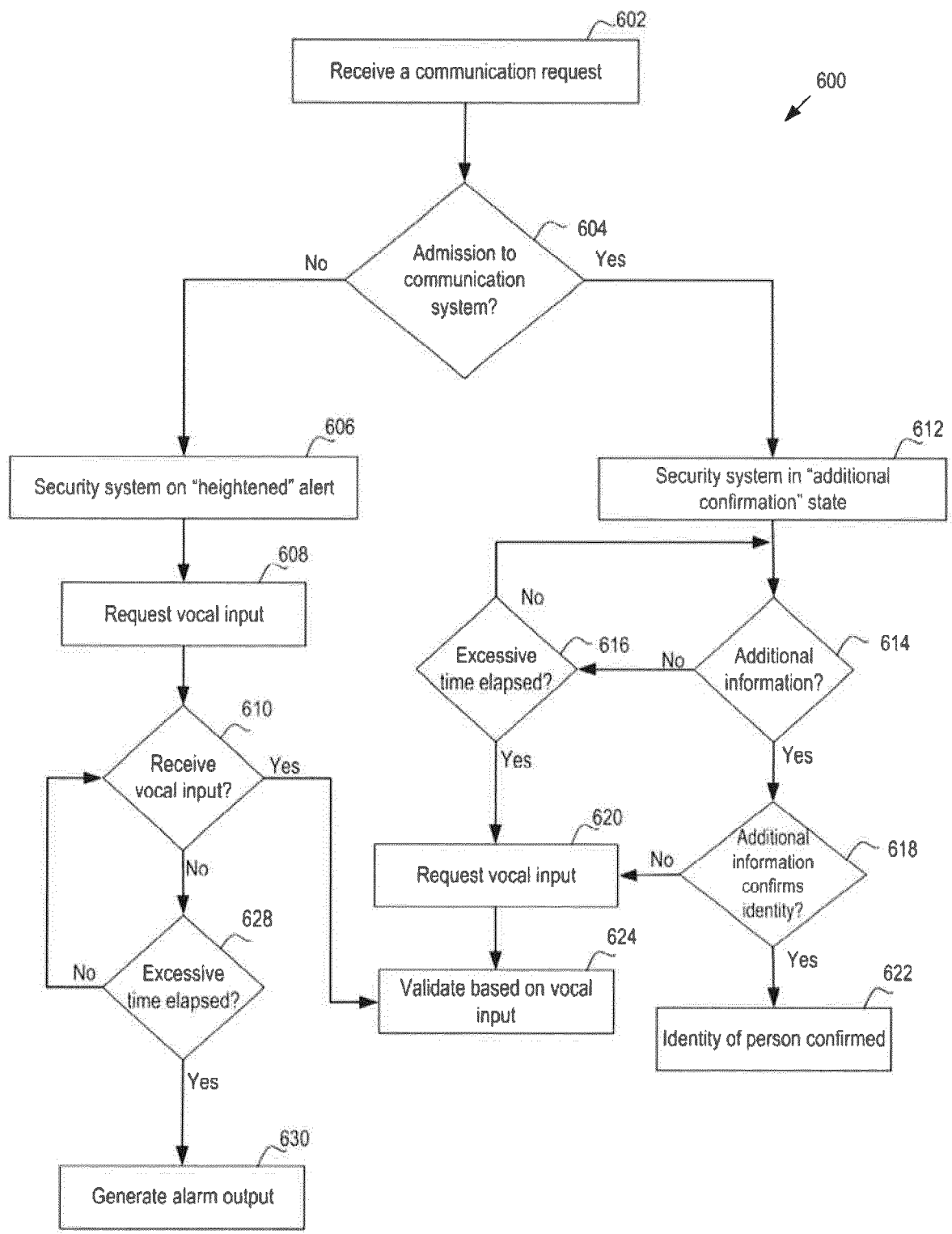
FIG. 6 is a flow chart of yet another example of monitoring communication requests in order to identify of a person on the premises.

FIG. 6 is a flow chart 600 of yet another example of monitoring communication requests in order to identify of a person on the premises. Flow chart 600 is similar to flow chart 400. However, instead of merely relying on communication parameters for confirmation, flow chart 600 uses communication parameters and at least one additional parameter to identify a person in environment 100.

At 602, the environment 100 receives a communication request. At 604, it is determined whether the electronic device that generated the communication request is admitted to communicate via the communication system. If so, at 612, the security system 110 changes its state to "additional confirmation" state, whereby the security system seeks additional information to confirm the identity of the person in environment 100. At 614, the security system 110 determines whether additional information has been received. If not, at 616, the security system 110 determines whether an excessive amount of time has elapsed. If not, the flow diagram 600 loops back to 614. If so, at 620, the security system 110 requests vocal input. At 624, the security system then validates (or rejects) the identity of the person based on the vocal input received. If additional information is received, at 617, the security system determines whether the additional information confirms the identity of the person. As discussed above, a profile may include communication parameters of the individual and other parameters (such as other patterns) associated with the individual. The security system may use both the communication parameters and other parameters to match to a specific profile. If so, at 622, the security system 110 confirms the identity of the person based on the matched profile. If not, flow diagram 600 loops to 620 to request vocal input, and thereby confirm the identity of the person in that matter.

If at 604 admission to the communication system is denied, at 606, the security system 110 changes its state, such as placing the security system on "heightened alert". Changing the state of the security system may modify one or more aspects of the security system, such as any one, any combination, or all of the following: control of sensors (e.g., the security system may make sensors more sensitive in the "heightened" state than in the normal operation state so that sensors report alarms more frequently in the "heightened" state); response to input (e.g., the security system may trigger an alarm more quickly in the "heightened" state in response to an event as indicated by the security system sensors); or internal decisions in identifying persons (e.g., the security system in the "heightened" state may require additional information to identify a person).

At 608, the security system 110 requests vocal input. At 628, the security system 110 determines whether the vocal input has been received. If so, flow chart 600 goes to 624. If not, the security system 110 determines whether excessive time has passed. If so, at 630, the security system 110 generates an alarm output. The alarm output may comprise an output local to the environment 100 (such as a horn alarm). Alternatively, or in addition, the alarm output may comprise a notification of an alarm to a central monitoring system.

Figure 7:
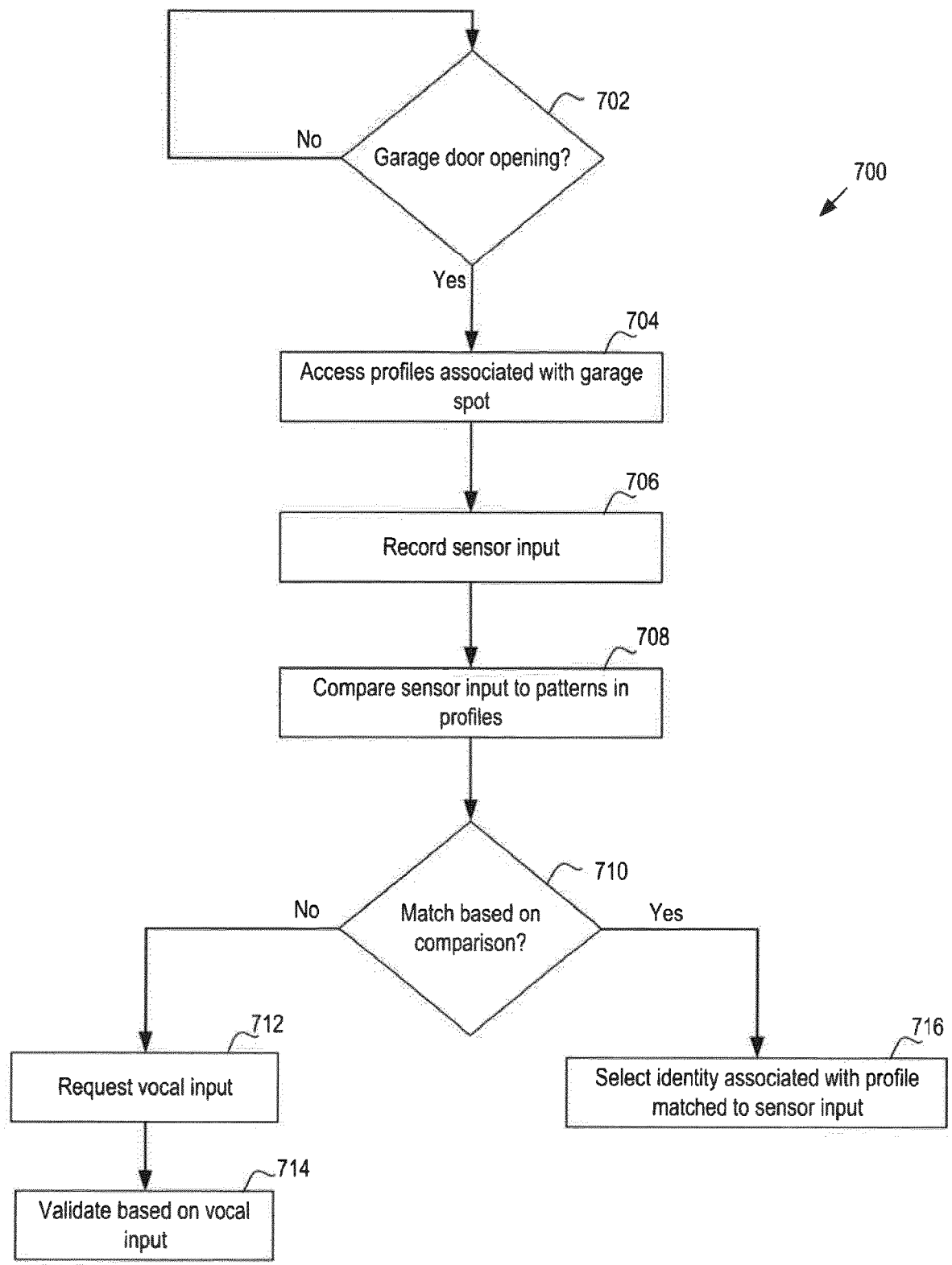
FIG. 7 is a flow chart of one example of monitoring entrances (such as a garage door) in order to identify a person on the premises.

FIG. 7 is a flow chart 700 of one example of monitoring entrances (such as a garage door) in order to identify a person on the premises. At 702, the security system 110 determines whether an entrance, such as a garage door, has opened. If so, at 704, the security system 110 accesses profiles that indicate the respective individuals, associated with the accessed profiles, that typically use the entrance (such as use the garage door that has been opened). At 706, the security system records sensor input. The sensor input may comprise sensors input other than the sensor associated with the entrance (e.g., a sensor other than the garage door sensor). At 708, the security system 110 may compare the sensor input to patterns in the profiles. At 710, the security system 110 may determine whether there is a match. For example, the profiles accessed at 704 may be used to compare with the recorded sensor input at 708 in order to determine whether there is a match in the pattern of sensor input recorded. If there is a match to one of the profiles, at 716, the security system selects the identity associated with the profile that matched the sensor input. If not, at 712, the security system may request vocal input, and at 714, validate the person based on the vocal input.

Figure 8:
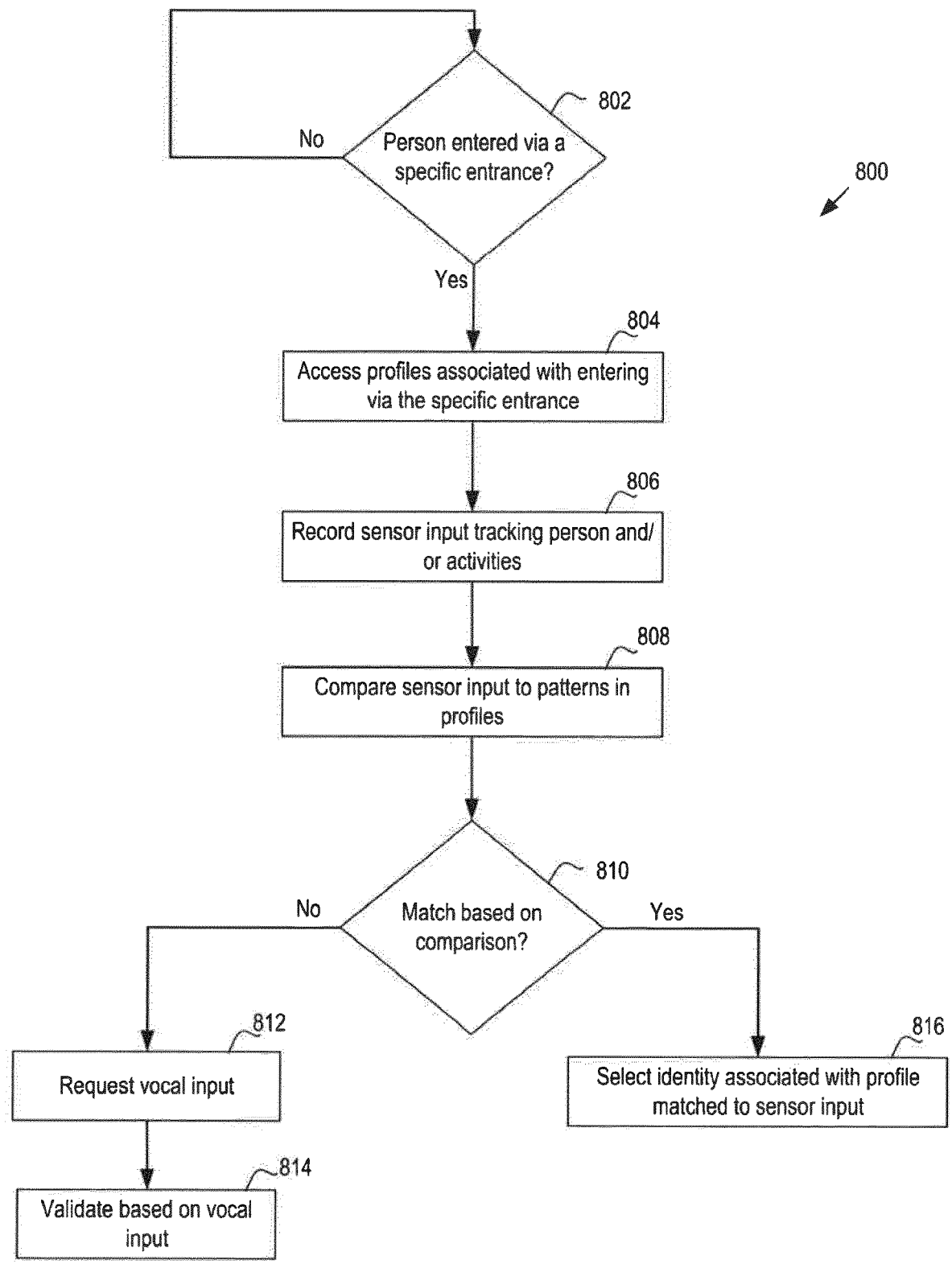
FIG. 8 is a flow chart of another example of monitoring entrances in order to identify a person on the premises.

FIG. 8 is a flow chart 800 of another example of monitoring entrances in order to identify a person on the premises. At 802, the security system 110 determines whether a person entered via a specific entrance. If so, at 804, the security system 110 accesses profiles associated with entering via the specific entrance. At 806, the security system 110 records sensor input tracking the person and/or activities of the person. For example, the security system 110 may record the areas within the environment that the person goes and/or the length of time that the person spends in the areas. As another example, the security system 110 may record activities of the person, such as interaction with electronic devices (e.g., use of the Internet via Wi-Fi access point 112), interaction with devices in the premises (such as the microwave, oven, etc.) or the like. At 808, the security system 110 may compare the sensor input to patterns in the profiles. At 810, the security system 110 may determine whether there is a match. If there is a match to one of the profiles, at 816, the security system selects the identity associated with the profile that matched the sensor input. If not, at 812, the security system may request vocal input, and at 814, validate the person based on the vocal input.

Figure 9:
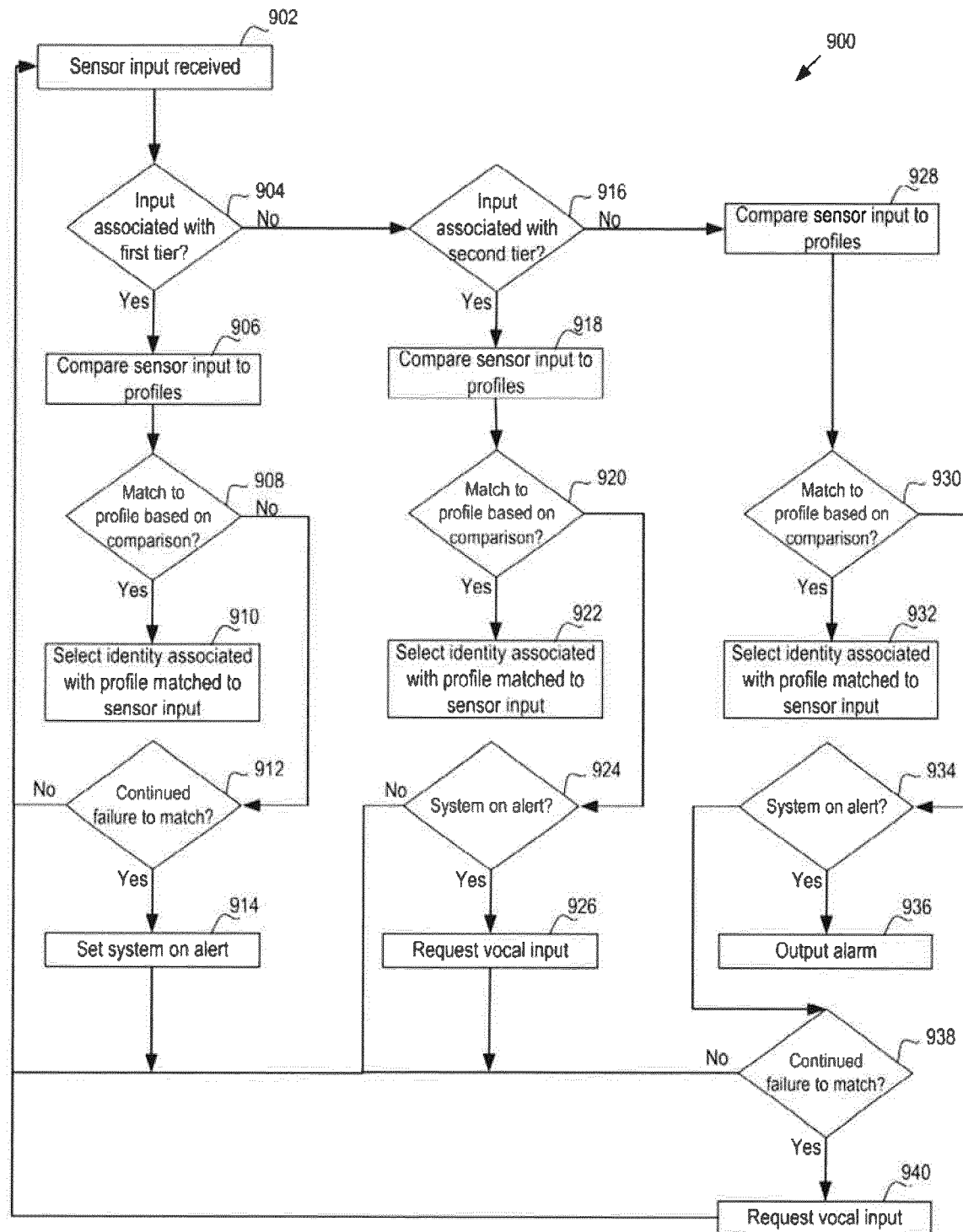
FIG. 9 is a flow chart of an example of using a multi-tier security system in order to identify of a person on the premises.

FIG. 9 is a flow chart 900 of an example of using a multi-tier security system in order to identify of a person on the premises. At 902, the security system receives sensor input. At 904, the security system determines whether the sensor input is associated with the first tier in the multi-tier security system. If not, at 916, the security system determines whether the sensor input is associated with the second tier in the multi-tier security system. If not, the sensor input, in the three-tier security system, is associated with the third tier.

At each of 906, 918 and 928, the security system compares the sensor input to stored profiles. Further, at each of 908, 920 and 930, the security system determines whether there is a match based on the comparison. If so, at each of 910, 922, and 932, the security system selects the identity of individual associated with the profile that matched the sensor input. If not, at 912, the security system determines whether there has been a continued failure to match. In particular, the security system may monitor whether it has previously received sensor input and has been unable to identify the individual associated with the sensor input. If so, at 914, the security system may change its state to alert. If not, flow diagram 900 loops back to 902. Likewise, if the security system fails to match at 920, at 924, the security system determines whether the system is on alert (which was set at 914). If so, at 926, the security system request vocal input in order to verify the person on the premises. If not, the flow diagram 900 loops back to 902. Further, if the security system fails to match at 930, at 934, the security system determines whether the system is on alert (which was set at 914). If so, at 936, the security system outputs an alarm (e.g., an audible output at the premises and/or a communication to a central monitoring system). If not, at 938, the security system determines whether there is a continued failure to match. If so, the security system request vocal input in order to verify the person on the premises. If not, the flow diagram 900 loops back to 902.

Figure 10:
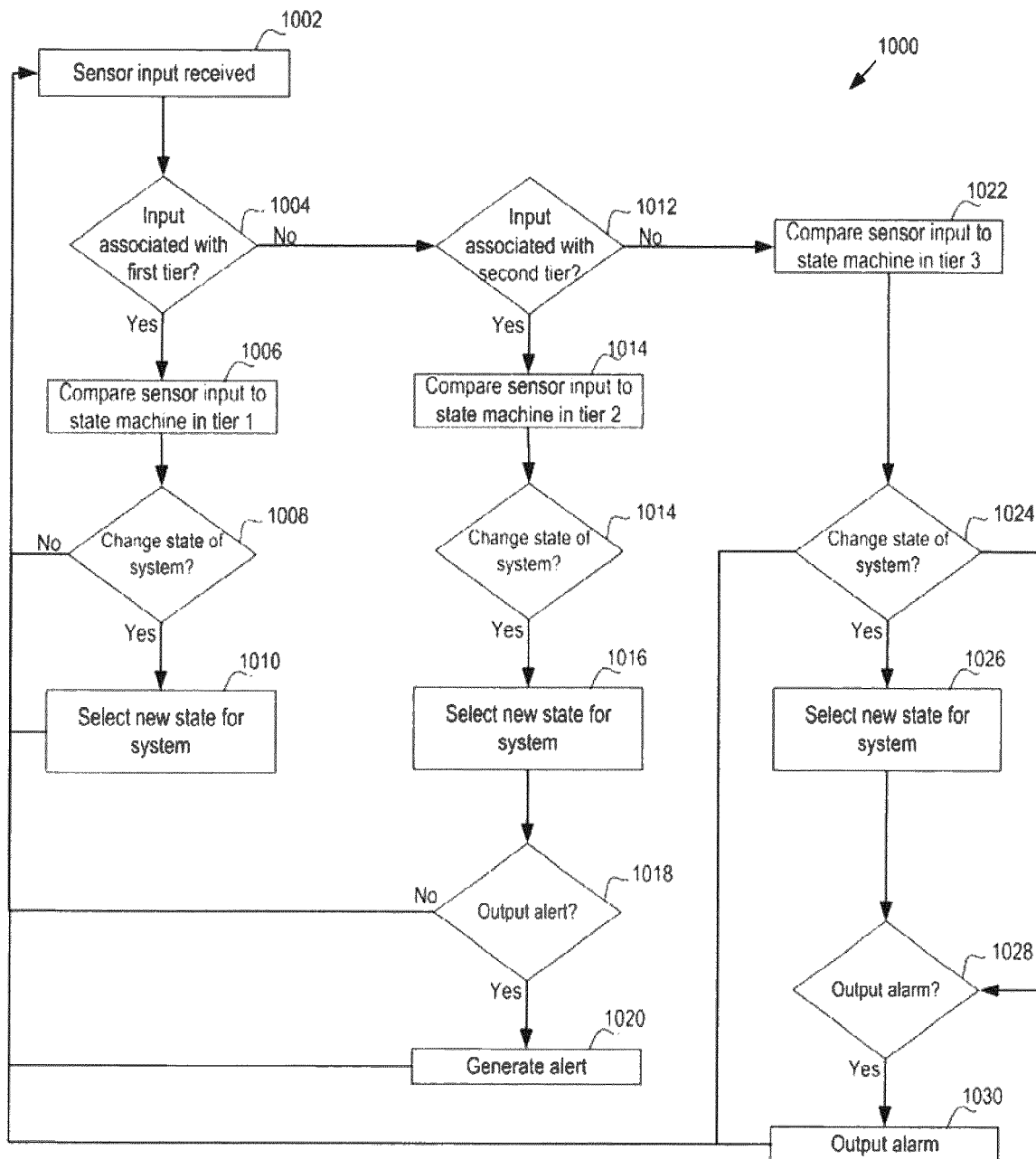
FIG. 10 is a flow chart of an example of using a multi-tier security system in order to manage outputs of the security system.

FIG. 10 is a flow chart 1000 of an example of using a multi-tier security system in order to manage outputs of the security system. At 1002, the security system receives sensor input. At 1004, the security system determines whether the sensor input is associated with the first tier in the multi-tier security system. If not, at 1012, the security system determines whether the sensor input is associated with the second tier in the multi-tier security system. If not, the sensor input, in the three-tier security system, is associated with the third tier.

At each of 1006, 1014, and 1022, the security system compares the sensor input to stored profiles. Further, at each of 1008, 1014 and 1024, the security system determines whether to change the state of the security system based on the comparison. If so, at each of 1010, 1016, and 1026, the security system selects the new state for the security system. In one implementation, the security system changes its state based on whether the respective tier that the input is received. For example, in response to sensor input received in the first tier, the security system changes the state to "low alert". In response to sensor input received in the second tier, the security system changes the state to "medium alert". Finally, in response to sensor input received in the third tier, the security system changes the state to "high alert".

As another example, the security system may change the state of the system based on the type of sensor input. For example, sensor input indicative of movement in the environment 100 (such as input from a motion sensor) may result in a different change of state than sensor input indicative of communication in the environment 100 (such as a request to connect to the Wi-Fi access point 112).

At 1018, the security system determines whether to output an alert. If so, at 1020, the security system outputs an alert. The alert may take one or more forms, such as an alert to request vocal input for verification. At 1028, the security system determines whether to output an alarm. If so, at 1030, the security system outputs an alarm. The alarm may take one or more forms, such as an aural alarm at the premises or a communication to a central monitoring system, with the communication indicating an alarm event. If no output is generated, the flow diagram 1000 loops back to 1002.

Figure 11:
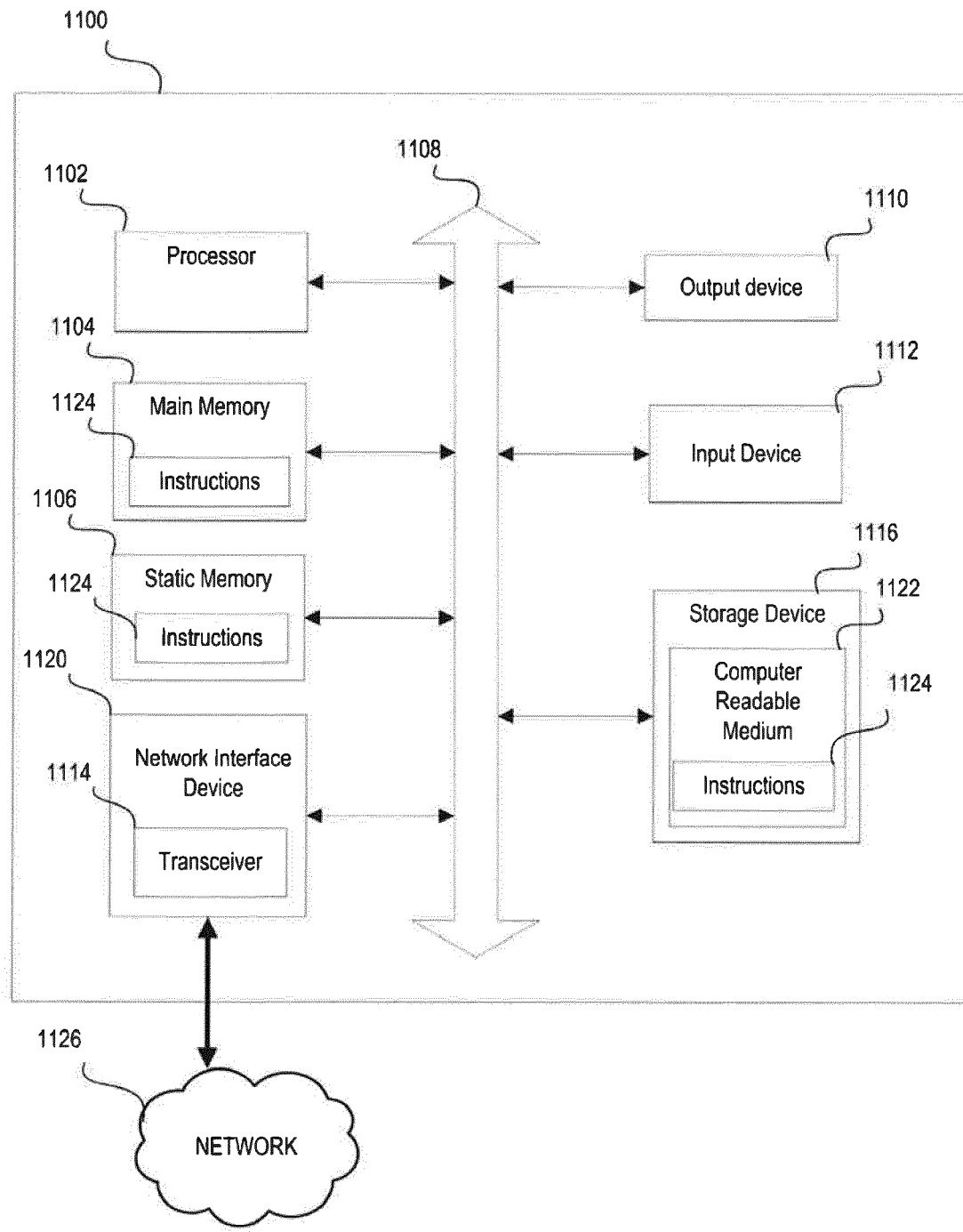
FIG. 11 illustrates a block diagram of exemplary computer architecture for a device in the environment of the security system of FIG. 1.

Each of security system 110, electronic device 1 (130), and electronic device M (132) illustrated in FIG. 1 and central monitoring system (not shown) may include one or more components of computer system 1100 illustrated in FIG. 11.

FIG. 11 illustrates exemplary computer architecture for computer system 1100. Computer system 1100 includes a network interface 1120 that allows communication with other computers via a network 1126, where network 1126 may be used to communicate wired or wirelessly, such as 114, 116, 118, 122, 126, 152 in FIG. 1. Network 1126 may be any suitable network and may support any appropriate protocol suitable for communication to computer system 1100. In an embodiment, network 1126 may support wireless communications. In another embodiment, network 1126 may support hard-wired communications, such as a telephone line or cable. In another embodiment, network 1126 may support the Ethernet IEEE (Institute of Electrical and Electronics Engineers) 802.3x specification. In still another embodiment, network 1126 may be the Internet and may support IP (Internet Protocol). In another embodiment, network 1126 may be a LAN or a WAN. In another embodiment, network 1126 may be a hotspot service provider network. In another embodiment, network 1126 may be an intranet. In another embodiment, network 1126 may be a GPRS (General Packet Radio Service) network. In another embodiment, network 1126 may be any appropriate cellular data network or cell-based radio network technology. In another embodiment, network 1126 may be an IEEE 802.11 wireless network. In still another embodiment, network 1126 may be any suitable network or combination of networks. Although one network 1126 is shown in FIG. 11, network 1126 may be representative of any number of networks (of the same or different types) that may be utilized.

The computer system 1100 may also include a processor 1102, a main memory 1104, a static memory 1106, an output device 1110 (e.g., a display or speaker), an input device 1112, and a storage device 1116, communicating via a bus 1108.

Processor 1102 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. Processor 1102 executes instructions 1124 stored on one or more of the main memory 1104, static memory 1106, or storage device 1115. Processor 1102 may also include portions of the computer system 1100 that control the operation of the entire computer system 1100. Processor 1102 may also represent a controller that organizes data and program storage in memory and transfers data and other information between the various parts of the computer system 1100.

Processor 1102 is configured to receive input data and/or user commands through input device 1112. Input device 1112 may be a keyboard, mouse or other pointing device, trackball, scroll, button, touchpad, touch screen, keypad, microphone, speech recognition device, video recognition device, accelerometer, gyroscope, global positioning system (GPS) transceiver (e.g., which may be used in electronic device 1 (130) or in electronic device M (132) with positional information transmitted to security system 110 for determination of location of electronic device 1 (130) or in electronic device M (132) in environment 100), or any other appropriate mechanism for the user to input data to computer system 1100 and control operation of computer system 1100 and/or operation of the security system 110. Input device 1112 as illustrated in FIG. 11 may be representative of any number and type of input devices.

Processor 1102 may also communicate with other computer systems via network 1126 to receive instructions 1124, where processor 1102 may control the storage of such instructions 1124 into any one or more of the main memory 1104 (e.g., random access memory (RAM)), static memory 1106 (e.g., read only memory (ROM)), or the storage device 1116. Processor 1102 may then read and execute instructions 1124 from any one or more of the main memory 1104, static memory 1106, or storage device 1116. The instructions 1124 may also be stored onto any one or more of the main memory 1104, static memory 1106, or storage device 1116 through other sources. The instructions 1124 may correspond to, for example, instructions that make up the operation of the security system 110 illustrated in FIG. 1.

Although computer system 1100 is represented in FIG. 11 as a single processor 1102 and a single bus 1108, the disclosed embodiments applies equally to computer systems that may have multiple processors and to computer systems that may have multiple busses with some or all performing different functions in different ways.

Storage device 1116 represents one or more mechanisms for storing data. For example, storage device 1116 may include a computer readable medium 1122 such as read-only memory (ROM), RAM, non-volatile storage media, optical storage media, flash memory devices, and/or other machine-readable media. In other embodiments, any appropriate type of storage device may be used. Although only one storage device 1116 is shown, multiple storage devices and multiple types of storage devices may be present. Further, although computer system 1100 is drawn to contain the storage device 1116, it may be distributed across other computer systems that are in communication with computer system 1100, such as a server in communication with computer system 1100. For example, when computer system 1100 is representative of security system 110, storage device 1116 may be in a single device or may be distributed across multiple devices (such as including in central monitoring system).

Storage device 1116 may include a controller (not shown) and a computer readable medium 1122 having instructions 1124 capable of being executed by processor 1102 to carry out functions of the security system 110. In another embodiment, some or all of the functions are carried out via hardware in lieu of a processor-based system. In one embodiment, the controller included in storage device 1116 is a web application browser, but in other embodiments the controller may be a database system, a file system, an electronic mail system, a media manager, an image manager, or may include any other functions capable of accessing data items. Storage device 1116 may also contain additional software and data (not shown), for implementing described features.

Output device 1110 is configured to present information to the user. For example, output device 1110 may be a display such as a liquid crystal display (LCD), a gas or plasma-based flat-panel display, or a traditional cathode-ray tube (CRT) display or other well-known type of display in the art of computer hardware. Accordingly, in some embodiments output device 1110 displays a user interface. In other embodiments, output device 1110 may be a speaker configured to output audible information to the user. In still other embodiments, any combination of output devices may be represented by the output device 1110.

Network interface 1120 provides the computer system 1100 with connectivity to the network 1126 through any compatible communications protocol. Network interface 1120 sends and/or receives data from the network 1126 via a wireless or wired transceiver 1114. Transceiver 1114 may be a cellular frequency, radio frequency (RF), infrared (IR) or any of a number of known wireless or wired transmission systems capable of communicating with network 1126 or other computer device having some or all of the features of computer system 1100. Bus 1108 may represent one or more busses, e.g., USB, PCI, ISA (Industry Standard Architecture), X-Bus, EISA (Extended Industry Standard Architecture), or any other appropriate bus and/or bridge (also called a bus controller). Network interface 1120 as illustrated in FIG. 11 may be representative of a single network interface card configured to communicate with one or more different data sources.

Computer system 1100 may be implemented using any suitable hardware and/or software, such as a personal computer or other electronic computing device. In addition, computer system 1100 may also be a portable computer, laptop, tablet or notebook computer, PDA, pocket computer, appliance, telephone, server computer device, or mainframe computer.

Thus, the methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A method for operating a multi-tier security system that comprises a first tier and a second tier outside a dwelling on a premises, the method comprising:

receiving, from a first sensor that is in the first tier outside the dwelling, an indication of an object in the premises;
determining, responsive to receiving the indication, to assign an identity to the object based on the indication;
tracking, by a second sensor that is in the second tier that is outside the dwelling and closer in proximity to the dwelling than the first tier, movement of the object on the premises;
determining, based on the movement detected in the second tier, whether to maintain the identity that was assigned to the object based on the indication received from the first tier; and
in response to determining not to maintain the identity assigned to the object, generating at least one output by the multi-tier security system.

2. The method of claim 1, wherein generating the at least one output comprises generating the at least one output by the multi-tier security system in order to receive input from the object regarding identification information.

3. The method of claim 1, wherein the object is a person.

4. The method of claim 1, wherein receiving the indication comprises:

receiving, via a sensor communication interface of the multi-tier security system, first sensor data from the first sensor;
determining that the first sensor data is associated with the first tier; and
changing a state of the multi-tier security system to a first state that corresponds to a first alert level, in response to the first sensor data being received from the first tier outside the dwelling.

5. The method of claim 4, wherein tracking the movement comprises:

receiving, via the sensor communication interface of the multi-tier security system, second sensor data from the second sensor;
determining that the second sensor data is associated with the second tier; and
changing the state of the multi-tier security system to a second state that corresponds to a second alert level that is higher than the first alert level, in response to the second sensor data being received from the second tier outside the dwelling and closer in proximity to the dwelling than the first tier.

6. The method of claim 5, further comprising determining, based on the second state of the multi-tier security system, whether to generate an output via an output interface of the multi-tier security system.

7. The method of claim 5, wherein determining that the first sensor data is associated with the first tier comprises determining that the first sensor is assigned to the first tier; and
wherein determining that the second sensor data is associated with the second tier comprises determining that the second sensor is assigned to the second tier.

8. The method of claim 1, wherein the indication indicates a first movement of the object in the first tier of the premises.

9. The method of claim 8, wherein tracking the movement comprises receiving a second indication of a second movement in the second tier of the premises.

10. The method of claim 9, further comprising:
determining whether the second indication of the second movement in the second tier of the premises is unauthorized;
in response to determining that the second indication of the second movement in the second tier of the premises is unauthorized and that the identity of the object is determined, performing a first action; and in response to determining that the second indication of the second movement in the second tier of the premises is unauthorized and that the identity of the object is not determined, performing a second action, the second action being different from the first action.

11. The method of claim 10, further comprising:

determining whether there is an event in a third tier of the premises, the third tier comprising an interior of the dwelling on the premises;

in response to determining that there is the event in the third tier of the premises, that the second indication of the second movement in the second tier of the premises is unauthorized, and that the identity of the object is determined, generating an output to request identification from the object; and in response to determining that there is the event in the third tier of the premises, that the second indication of the second movement in the second tier of the premises is unauthorized, and that the identity of the object is not determined, immediately generating an alarm.

12. A multi-tier security system that comprises a first tier and a second tier outside a dwelling on a premises, the multi-tier security system comprising:

a sensor communication interface configured to communicate with a plurality of sensors;

an output interface; and one or more processors in communication with the sensor communication interface, the one or more processors configured to:

receive, from a first sensor that is in the first tier outside the dwelling, an indication of an object in the premises;

determine, responsive to receiving the indication, to assign an identity to the object based on the indication;

track, by a second sensor that is in the second tier that is outside the dwelling and closer in proximity to the dwelling than the first tier, movement of the object on the premises;

determine, based on the movement detected in the second tier, whether to maintain the identity that was assigned to the object based on the indication received from the first tier; and in response to determining not to maintain the identity assigned to the object, generate at least one output by the multi-tier security system.

13. The multi-tier security system of claim 12, wherein the one or more processors are configured to generate the at least one output by the multi-tier security system in order to receive input from the object regarding identification information.

14. The multi-tier security system of claim 12, wherein the object is a person.

15. The multi-tier security system of claim 12, wherein to receive the indication, the one or more processors are configured to:

receive, via the sensor communication interface, first sensor data from the first sensor;

determine that the first sensor data is associated with the first tier; and change a state of the multi-tier security system to a first state that corresponds to a first alert level, in response to the first sensor data being received from the first tier outside the dwelling.

16. The multi-tier security system of claim 15, wherein to track the movement, the one or more processors are configured to:

receive, via the sensor communication interface, second sensor data from the second sensor;

determine that the second sensor data is associated with the second tier; and change the state of the multi-tier security system to a second state that corresponds to a second alert level that is higher than the first alert level, in response to the second sensor data being received from the second tier outside the dwelling and closer in proximity to the dwelling than the first tier.

17. The multi-tier security system of claim 16, wherein the one or more processors are further configured to determine, based on the second state of the multi-tier security system, whether to generate an output via the output interface of the multi-tier security system.

18. A multi-tier security system that comprises a first tier and a second tier outside a dwelling on a premises, the multi-tier security system comprising:

one or more memories; and one or more processors in communication with the one or more memories and configured to:

receive, from a first sensor that is in the first tier outside the dwelling, an indication of an object in the premises;

determine, responsive to receiving the indication, to assign an identity to the object based on the indication;

track, by a second sensor that is in the second tier that is outside the dwelling and closer in proximity to the dwelling than the first tier, movement of the object on the premises;

determine, based on the movement detected in the second tier, whether to maintain the identity that was assigned to the object based on the indication received from the first tier; and in response to determining not to maintain the identity assigned to the object, generate at least one output by the multi-tier security system.

* * * * *